Nov. 1, 1960     B. E. BROBERG     2,958,297
CARRIAGE BODY SUSPENSION FOR VEHICLES
Filed Feb. 24, 1958     2 Sheets-Sheet 1

INVENTOR.
B. E. Broberg
BY
ATTYS.

Nov. 1, 1960  B. E. BROBERG  2,958,297
CARRIAGE BODY SUSPENSION FOR VEHICLES
Filed Feb. 24, 1958  2 Sheets-Sheet 2

INVENTOR.
B. E. Broberg
BY
ATTYS.

United States Patent Office 2,958,297
Patented Nov. 1, 1960

2,958,297

CARRIAGE BODY SUSPENSION FOR VEHICLES

Björn Erik Broberg, Linkoping, Sweden, assignor to AB Svenska Jarnvagsverkstaderna, Tannefors, Linkoping, Sweden, a Swedish joint-stock company Filed Feb. 24, 1958, Ser. No. 716,958

6 Claims. (Cl. 105—212)

The present invention relates to a device in two axle rolling vehicles, particularly rail carriages, with a spring system supporting the carriage body, including torsion spring rods, and the object of the invention is inter alia to reduce the stress on the torsion spring rods and at the same time to make the suspension resilient.

Hitherto torsion spring rods have been used for several kinds of vehicles, but the use has been connected with certain difficulties, due to the fact that the spring rods have been mounted transversely in the vehicle or that their length has been relatively short. For this reason the stresses must become relatively great, in order to have the spring rods sufficiently twisted in relation to the load.

Figure 1:
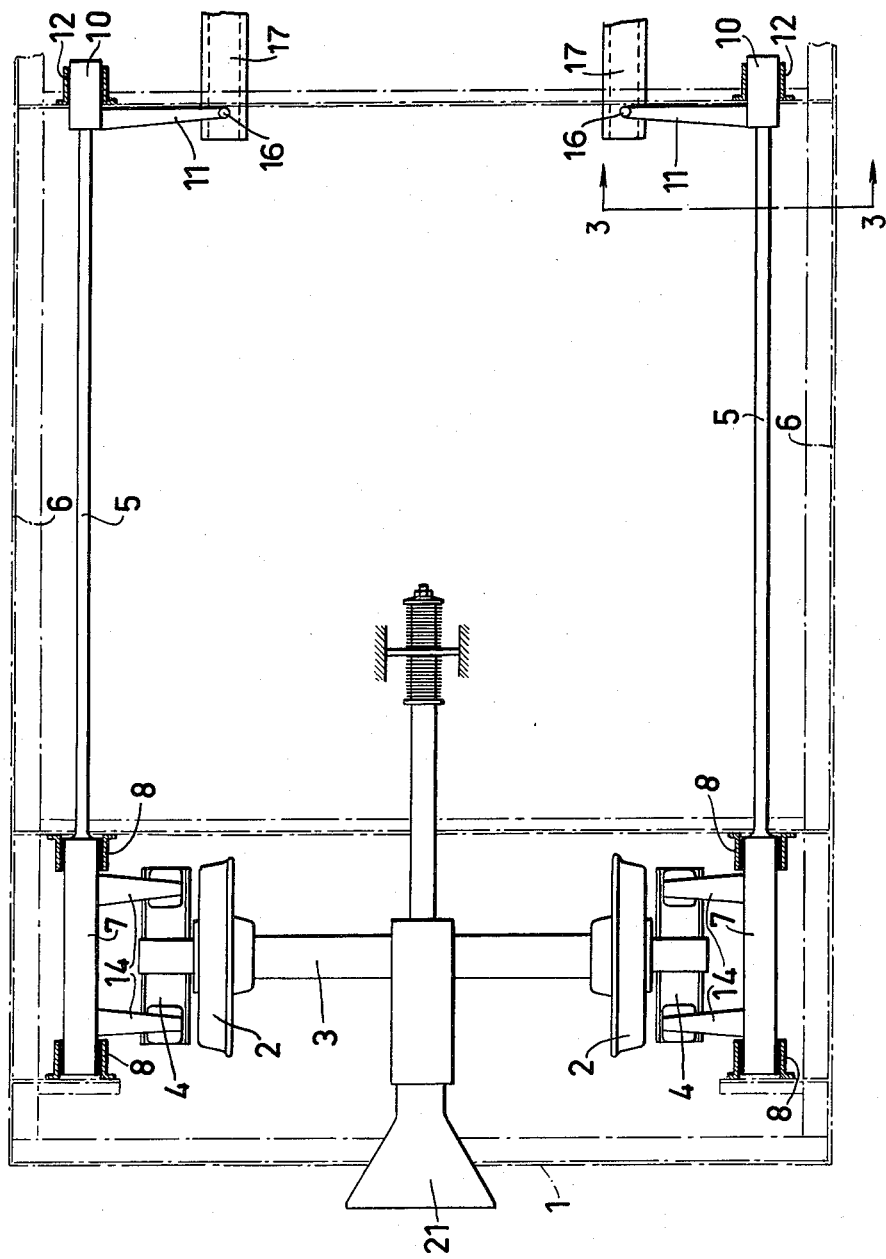
Figure 2:
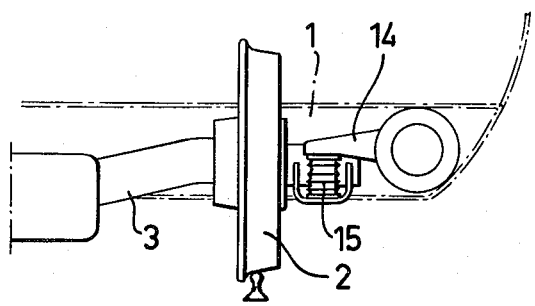
Figure 3:
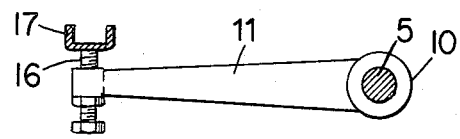

An embodiment of the invention is illustrated in the accompanying drawings. Fig. 1 is a plan view of the running gear of a rail vehicle with two wheel axles; Fig. 2 is an end view of a part of the running gear; and Fig. 3 is a sectional view on an enlarged scale taken on line 3—3 of Fig. 1.

The frame which supports the carriage body is designated by 1 and 6, reference numeral 2 designates the wheels which are running freely on the wheel axle 3 which is mounted in two yokes 4, one at each end of the axle. Reference numeral 5 designates each of two torsion spring rods, each mounted along its respective frame beam 6. Each spring rod has one end fixed to a shaft 7 pivotal about its own axis in bearings 8 fixed in the frame. The other end of the spring rod is fixed in a hub 10 or the like to a lever 11, the said lever being intended for adjustment of the torsion of the spring rod. For this purpose, as seen in Figure 3, the hub is mounted in a sleeve 12 attached to a cross beam secured to the frame beam 6 in which the hub 10 is held adjusted by lever 11 at the end of which a screw 16 is provided to press against a fixed part of the car, for example a frame member 17. As illustrated, each torsion spring rod 5 is of great length in relation to its maximum cross section, the ratio suggested being within the limits 60:1 and 75:1. Reference numeral 14 designates projections in the form of levers mounted on the shaft 7, which rest on elements 15 on each side of the shaft 3 on the yoke 4. Elements 15 (Fig. 2) may be resilient elements such as coil springs or blocks of rubber. The load of the carriage body thus is transferred to the yokes 4 by means of the two levers 14 at the outside of each wheel and to the torsion spring rods 5, which are mounted in the longitudinal direction of the carriage, by means of which the spring rod can have a great length in relation to its cross section, as shown in Fig. 1. This is an advantage, for thereby the stress will be moderate and the suspension will be resilient. In addition, it is a simple matter to manufacture the device, and members which easily come out of order can be dispensed with. As a consequence of the adjustment of the torsion of the spring rods by means of the screws 16, adjusting the floor height of the car also becomes possible.

By providing two levers 14 at the outside of each wheel, instead of one, these may have smaller dimensions. Due to the fact that the levers rest resiliently on elements 15 against the yokes 4, there is the advantage that the wheel axle can swing in curves and that the carriage body can move laterally in relation to the wheels.

In Fig. 1 a central coupling is shown which is attached to the running gear, the coupling head 21 of which is provided with elements of any kind. As this central coupling is outside the scope of the invention it will not be described here.

What I claim is:

1. A resilient carriage body suspension for vehicles, particularly rail carriages, including a vehicle frame and at least one wheel and axle assembly, said suspension comprising a pair of torsion spring rods for said axle assembly mounted to extend in the longitudinal direction of the vehicle, one said rod along each side of the vehicle frame, each rod having one end non-rotatably mounted on the vehicle frame and the other end pivotally mounted to the frame, the pivotal end portion of the rod being provided with a pair of generally horizontal projecting arms resting on said wheel and axle assembly, said wheel and axle assembly including a yoke mounted on said axle adjacent each wheel extending to each side of said axle parallel to the plane of rotation of said wheel, and a pair of resilient compression elements on each said yoke placed one on each side of said axle, the ends of said projecting arms engaging said wheel and axle assembly only by engaging the tops of said resilient compression elements whereby the wheel and axle assembly can swing in curves and the carriage body can move laterally in relation to the wheels.

2. Carriage body suspension according to claim 1, in which said resilient compression elements are helical springs.

3. Carriage body suspension according to claim 1, in which the pivotally mounted end of each torsion spring rod is mounted in two bearings, one in front of and the other one behind the pair of projecting arms, both of which bearings are attached to the frame.

4. Carriage body suspension according to claim 1, in which the non-rotatably mounted end of the torsion spring rod is mounted in a bearing sleeve and provided with an arm laterally protruding from the rod by means of which arm the rotation of the rod in one direction is prevented, said arm being arranged for adjustably pivoting the end of the spring rod for varying the torsion of the spring rod and of the floor height.

5. Carriage body suspension according to claim 1, in which each torsion spring rod has a length in relation to its maximum cross section line, approximately in a ratio between the limits of 60:1 and 75:1.

6. Carriage body suspension according to claim 1, in which said resilient compression elements are rubber.

References Cited in the file of this patent

UNITED STATES PATENTS

| | | |
|---|---|---|
| 154,917 | Saladee | Sept. 8, 1874 |
| 2,166,769 | Kabe | July 18, 1939 |
| 2,260,508 | Chambers | Oct. 28, 1941 |
| 2,268,439 | Beebe | Dec. 30, 1941 |
| 2,273,053 | Ledwinka | Feb. 17, 1942 |
| 2,283,971 | Chambers | May 26, 1942 |
| 2,344,521 | Meyer et al. | Mar. 21, 1944 |
| 2,344,522 | Pflager et al. | Mar. 21, 1944 |
| 2,371,169 | Hickman | Mar. 13, 1945 |
| 2,410,068 | Hickman | Oct. 29, 1946 |